US007532885B2

(12) United States Patent
Choi et al.

(10) Patent No.: US 7,532,885 B2
(45) Date of Patent: May 12, 2009

(54) METHOD FOR SELECTING A SERVICE PROVIDER FOR A SERVICE, WHICH CAN BE RECEIVED BY A MOBILE STATION VIA A RADIO ACCESS NETWORK AND WHICH IS PROVIDED BY AT LEAST TWO SERVICE PROVIDERS, AND A CORRESPONDING SELECTING DEVICE

(75) Inventors: Hyung-Nam Choi, Hamburg (DE); Michael Eckert, Braunschweig (DE); Martin Hans, Bad Salzdetfurth / Heinde (DE)

(73) Assignee: Siemens Aktiengesellschaft, Munich (DE)

( * ) Notice: Subject to any disclaimer, the term of this patent is extended or adjusted under 35 U.S.C. 154(b) by 419 days.

(21) Appl. No.: 10/562,845

(22) PCT Filed: Jun. 22, 2004

(86) PCT No.: PCT/EP2004/051193

§ 371 (c)(1),
(2), (4) Date: Dec. 29, 2005

(87) PCT Pub. No.: WO2005/004518

PCT Pub. Date: Jan. 13, 2005

(65) Prior Publication Data

US 2006/0166668 A1    Jul. 27, 2006

(30) Foreign Application Priority Data

Jul. 1, 2003    (DE) ................................. 103 29 652

(51) Int. Cl.
  *H04W 4/00*     (2009.01)
  *H04W 40/00*    (2009.01)
  *H04M 11/00*    (2006.01)
  *G06Q 30/00*    (2006.01)

(52) U.S. Cl. .................... 455/435.2; 455/406; 455/445; 370/238; 705/1; 705/37

(58) Field of Classification Search ............... 455/435.2
See application file for complete search history.

(56) References Cited

U.S. PATENT DOCUMENTS 5,915,214 A * 6/1999 Reece et al. ................ 455/406

(Continued)

FOREIGN PATENT DOCUMENTS

EP        1096825 A1 *  5/2001
WO        WO 02/32181 A1   4/2002

OTHER PUBLICATIONS

"3$^{RD}$ Generation Partnership Project; Technical Specification Group Services and System Aspects; Advice of Charge (AOC Supplementary Services—Stage 1", 3G TS 22.086 V3.1.0, 1999, pp. 1-11, 3GPP Organizational Partners, Valbonne, France.

*Primary Examiner*—Nick Corsaro
*Assistant Examiner*—Tangela T Chambers

(57) ABSTRACT

A method for selecting a service provider for a service, which can be received by a mobile station via a radio access network and which is provided by at least two service providers, as well as to a corresponding selecting device are shown. During a method for selecting a service provider for a service, which can be received by a mobile station via a radio access network and which is provided by at least two service providers, a selecting device receives a request for selecting the service provider from the mobile station via an interface. The service providers are requested by the selecting device for indicating a value of a selection parameter, and the selecting device selects one of the service providers for the service according to the indicated values of the selection parameter.

14 Claims, 2 Drawing Sheets

U.S. PATENT DOCUMENTS

| | | | |
|---|---|---|---|
| 6,101,379 A * | 8/2000 | Rahman et al. | 455/406 |
| 6,690,929 B1 * | 2/2004 | Yeh | 455/406 |
| 6,853,621 B1 * | 2/2005 | Spear et al. | 370/238 |
| 2002/0023033 A1 * | 2/2002 | Campbell et al. | 705/36 |
| 2003/0003933 A1 * | 1/2003 | Deshpande et al. | 455/510 |
| 2003/0017828 A1 | 1/2003 | Kotzin et al. | |
| 2003/0045273 A1 * | 3/2003 | Pyhalammi et al. | 455/412 |
| 2003/0078019 A1 | 4/2003 | Dorenbsoch et al. | |
| 2003/0078800 A1 * | 4/2003 | Salle et al. | 705/1 |
| 2003/0182413 A1 * | 9/2003 | Allen et al. | 709/223 |
| 2004/0198356 A1 * | 10/2004 | Dunlop et al. | 455/435.2 |
| 2004/0203580 A1 * | 10/2004 | Engelhart | 455/406 |
| 2005/0043026 A1 * | 2/2005 | Brok et al. | 455/434 |

* cited by examiner

METHOD FOR SELECTING A SERVICE PROVIDER FOR A SERVICE, WHICH CAN BE RECEIVED BY A MOBILE STATION VIA A RADIO ACCESS NETWORK AND WHICH IS PROVIDED BY AT LEAST TWO SERVICE PROVIDERS, AND A CORRESPONDING SELECTING DEVICE

CROSS REFERENCE TO RELATED APPLICATIONS

This application is the US National Stage of International Application No. PCT/EP2004/051193, filed Jun. 22, 2004 and claims the benefit thereof. The International Application claims the benefits of German application No. 10329652.2 DE filed Jul. 1, 2003, both of the applications are incorporated by reference herein in their entirety.

FIELD OF INVENTION

The invention relates to a method for selecting a service provider for a service that can be received by a mobile station via a radio access network and is provided by at least two service providers, and to a corresponding selecting device.

BACKGROUND OF INVENTION

A multiplicity of technologies can be used for wireless data transmission. Mobile radio networks are operated using, for instance, the GSM (Global System for Mobile communications) or UMTS (Universal Mobile Telecommunications System) standard and wireless local area networks (WLAN) are operated using, for example, the IEEE (Institute of Electrical and Electronics Engineers) 802.11, HiperLAN (High-Performance LAN), or Bluetooth standard.

For full-coverage provisioning of mobile radio users, for instance mobile telephones or portable computers having a corresponding radio transmission device, it is possible to use mobile radio networks conforming to, for example, the GSM or UMTS standard. WLANs can be used for supplementing in what are termed hot spots, which is to say small, local areas having a high user density, such as airports or hotels.

The provider of a service in a radio communication system can be either the operator of the radio communication system or another service provider who, by way of suitable agreements, is allowed to access the radio communication system's infrastructure.

A service offered in a radio communication system can thus possibly be used by a mobile radio user via different service providers. Depending on what specific requirements the mobile radio user places on the desired service in terms, for example, of price or quality of data transmission, an alternative provider may in each case offer the mobile radio user the best conditions.

A method is known from WO 02/32181 A1 whereby a mobile station requests and receives a program from an operator of a radio communication system who is active in a first country. With the aid of said program a more favorably priced operator of a radio communication system in a second country can be selected for the mobile station. When a telecommunication service in the second country is requested, via a radio communication system of the second country the program controls a process of communicating with an accessibility assistant connected to the radio communication system of the first country. From the accessibility assistant the mobile station obtains a list of operators of radio communication systems in the second country along with information about said operators' prices. Either the mobile station user can then select one of the operators him- or herself or the program will automatically select the most favorable operator for the requested telecommunication service.

SUMMARY OF INVENTION

An object of the invention is therefore to disclose an advantageous method for selecting a service provider for a service that can be received by a mobile station via a radio access network of a radio communication system and is provided by at least two service providers via the radio access network of the radio communication system.

Said object is achieved by means of the method and the selecting device according to the independent claims.

Advantageous embodiments and developments of the invention are the subject of the dependent claims.

In the inventive method for selecting a service provider for a service that can be received by a mobile station via a radio access network and is provided by at least two service providers, a selecting device receives from the mobile station via a radio interface a request to select the service provider, the service providers are each requested by the selecting device to indicate a value of a selection parameter, and the selecting device selects one of the service providers for the service as a function of the indicated values of the selection parameter.

From a multiplicity of service providers the selecting device can select the one indicating the selection parameter that is the most favorable for the mobile station at the time it made the request. A selection parameter is, for instance, the price demanded for the service, the offered connection quality, or the data rate at which the respective service provider will transmit the service. Because the selecting device is connected to the mobile station via the radio interface, the most favorable service provider can be selected with minimal signaling, namely the request by the mobile station to select a service provider. The selecting device belongs, for example, to the radio communication system or is located externally and connected to the radio communication system preferably on a line-linked basis.

According to an advantageous development the mobile station is informed about the service provider selected for the service. The mobile station can then itself decide whether to set up a connection to the selected service provider. Said station thus has the option of not using the service or sending the selecting device a new request.

A renewed request could possibly allow an even more favorable service provider to be selected.

In an alternative embodiment of the invention the selecting device assigns the mobile station the service provider selected for the service for a connection setup via the radio interface. The mobile station will thus as a result of its request to select a service provider automatically be assigned the one most favorable for the desired service, which is to say the connection will be set up between the mobile station and most favorable service provider at the instigation of the selecting device.

It is especially advantageous if a first time interval is specified within which, after being requested to indicate the values of the selection parameter, the service providers are able to indicate their values. It will in this way be ensured that the selecting device does not wait unnecessarily long for values of the selection parameter to be indicated. Based on the selection parameter values received within the first time interval, the selecting device can either make a selection or, where applicable, send the service providers a renewed request to indicate a value of the selection parameter.

So that selecting a service provider does not take too long from the mobile station's viewpoint, it will be of practical advantage to specify a second time interval on whose expiration a service provider is selected for the service.

In a particularly preferred embodiment of the invention the selection parameter's values indicated by the service providers on expiration of the first time interval are compared with each other, a service provider is determined having the selection parameter value most favorable for the mobile station, and at least some of the service providers are again requested by the selecting device each to indicate a value of the selection parameter within a third, specifiable time interval. The service providers will thus have an opportunity to change their original offering and, by effecting such a change, undercut the previously most favorable service provider, which is to say to themselves become the most favorable service provider. The selecting device can of course also again request the service provider with the most favorable selection parameter value to indicate a value of said parameter so as also to give that service provider an opportunity to pre-empt undercutting by other service providers.

The service providers are to practical advantage notified of the most favorable value of the selection parameter along with the renewed request to indicate a value of the selection parameter. Similarly to an auction, where bidders know the current offered price and are better able on the basis thereof to decide their next bid, by being notified of the most favorable value of the selection parameter the service providers are given an opportunity to calculate on the basis of the known most favorable value whether and how far they wish to undercut the most favorable value of the selection parameter.

A development of the invention provides for the service providers to, along with the renewed request to indicate a value of the selection parameter, be informed if the same most favorable value of the selection parameter has been indicated by at least two service providers. This information is advantageous for the most favorable service providers because the only option remaining to the selecting device for selecting a service provider will in this case be to make a selection based on a drawing of lots. The information about the existence of the same most favorable values of the selection parameter will give service providers wishing to pre-empt a drawing of lots an opportunity to change their own value of the selection parameter, which is to say to undercut it, so as to become the only service provider with the most favorable value of the selection parameter.

It is especially advantageous for the selection parameter to be predefined by the mobile station. That will enable the mobile station itself to decide which selection criterion is to be applied in selecting a service provider.

A price for the service is advantageously applied as the selection parameter.

It is alternatively or additionally advantageous for a transmission quality of the service to be applied as the selection parameter.

BRIEF DESCRIPTION OF THE DRAWINGS

The invention is explained in more detail below with the aid of exemplary embodiments shown in the Figures.

Identical references in the Figures refer to the same items.

DETAILED DESCRIPTION OF INVENTION

A mobile station is any station able to receive services via a radio interface. A user station is considered in the following as being a mobile station. A user station is, for example, a mobile telephone or a transportable device for transmitting video and/or audio data, for faxing, SMS (Short Message Service) messaging, and e-mailing, and for accessing the internet. It is therefore a general transmitting and/or receiving unit of a radio communication system.

Services are to be understood as any kind of communication offerings a user station is offered via the radio interface. Services are thus to be understood as being, for example, voice connections, connections for transmitting data packets for software downloads or video transmissions, and also position determining by means of, for example, GPS (Global Positioning System).

The invention can be used to advantage in any radio communication systems having at least two service providers for an offered service. Radio communication systems are to be understood as any systems in which data transmission between stations takes place via a radio interface. Data transmission can take place on both a bidirectional and a unidirectional basis. Radio communication systems are in particular any mobile radio systems conforming to, for example, the GSM or UMTS standard. Future mobile radio systems for example of the fourth generation as well as wireless local area networks (WLAN) are also to be understood as being radio communication systems.

The invention is described below using a wireless local area network as an example, but without being restricted thereto.

Figure 1:
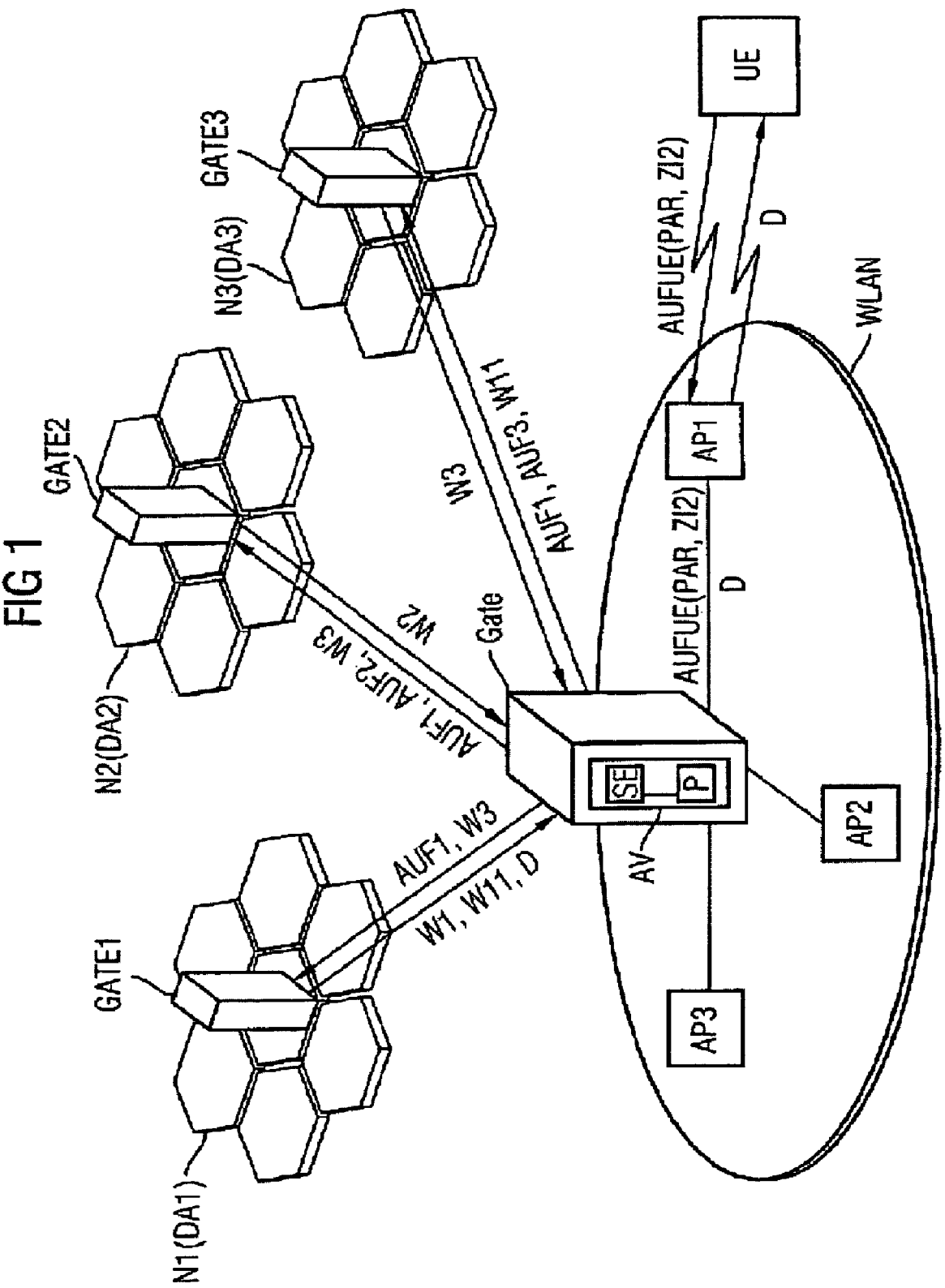
FIG. 1 shows an inventive radio communication system having a plurality of service providers.

FIG. 1 is a schematic of a wireless local area network WLAN. In this exemplary embodiment the wireless local area network WLAN has three access points AP1, AP2, AP3 via which user stations are able to set up connections to the WLAN. A user station UE is connected to a first access point AP1 via a radio link.

Data transmission is controlled within the WLAN by a control unit GATE to which the access points AP1, AP2, AP3 are connected preferably on a line-linked basis. The control unit GATE furthermore controls communication with three further radio communication systems N1, N2, N3 operated in conformity with, for example, the GSM or UMTS standard. The three radio communication systems N1, N2, N3, all operated by different service providers DA1, DA2, DA3, each have a control unit GATE1, GATE2, GATE3 connected to the control unit GATE preferably on a line-linked basis.

The user station UE wishes via the WLAN to receive a service D offered by the first service provider DA1, the second service provider DA2, and the third service provider DA3. To enable a service provider DA1, DA2, DA3 to be selected for transmitting the service D, the user station UE specifies a selection parameter PAR on the basis of which a selecting device AV of the control unit GATE can select a service provider. In this exemplary embodiment the selection parameter PAR is the price it is to cost to receive the service. A transmission quality, a data rate, or a combination of these criteria can of course also be specified as the selection parameter PAR. It is in particular also possible for the selection parameter PAR not to be specified by the user station UE but already to exist stored in the selecting device AV, which is to say to be specified by, for instance, the WLAN. Different selection parameters can be stored in the selecting device AV for different services.

The selecting device AV can of course also be located as a separate unit inside the WLAN or outside it and connected to the control unit GATE preferably on a line-linked basis.

In the exemplary embodiment shown in FIG. 1 the user station UE conveys the selection parameter PAR specified by it, which is to say the price for the service D, via the radio link to the selecting device AV that has a transmitting and receiving unit SE for receiving the selection parameter PAR. The user station UE simultaneously notifies the selecting device AV of a second time interval ZI within which the selecting device AV must have selected a service provider DA1, DA2, DA3 for the service D requested by the user station UE. The selecting device AV generates and, by means of a control unit P and by means of the transmitting and receiving unit SE, conveys requests AUF1, AUF2, AUF3 for indicating a value of the selection parameter PAR to the three service providers DA1, DA2, DA3 of the three radio communication systems N1, N2, N3, and receives the respective values W1, W2, W3, W11 of the selection parameter PAR from the service providers DA1, DA2, DA3. Using a configurable method, the selecting device AV selects the first service provider DA1 for transmitting the service D to the user station UE.

Figure 2:
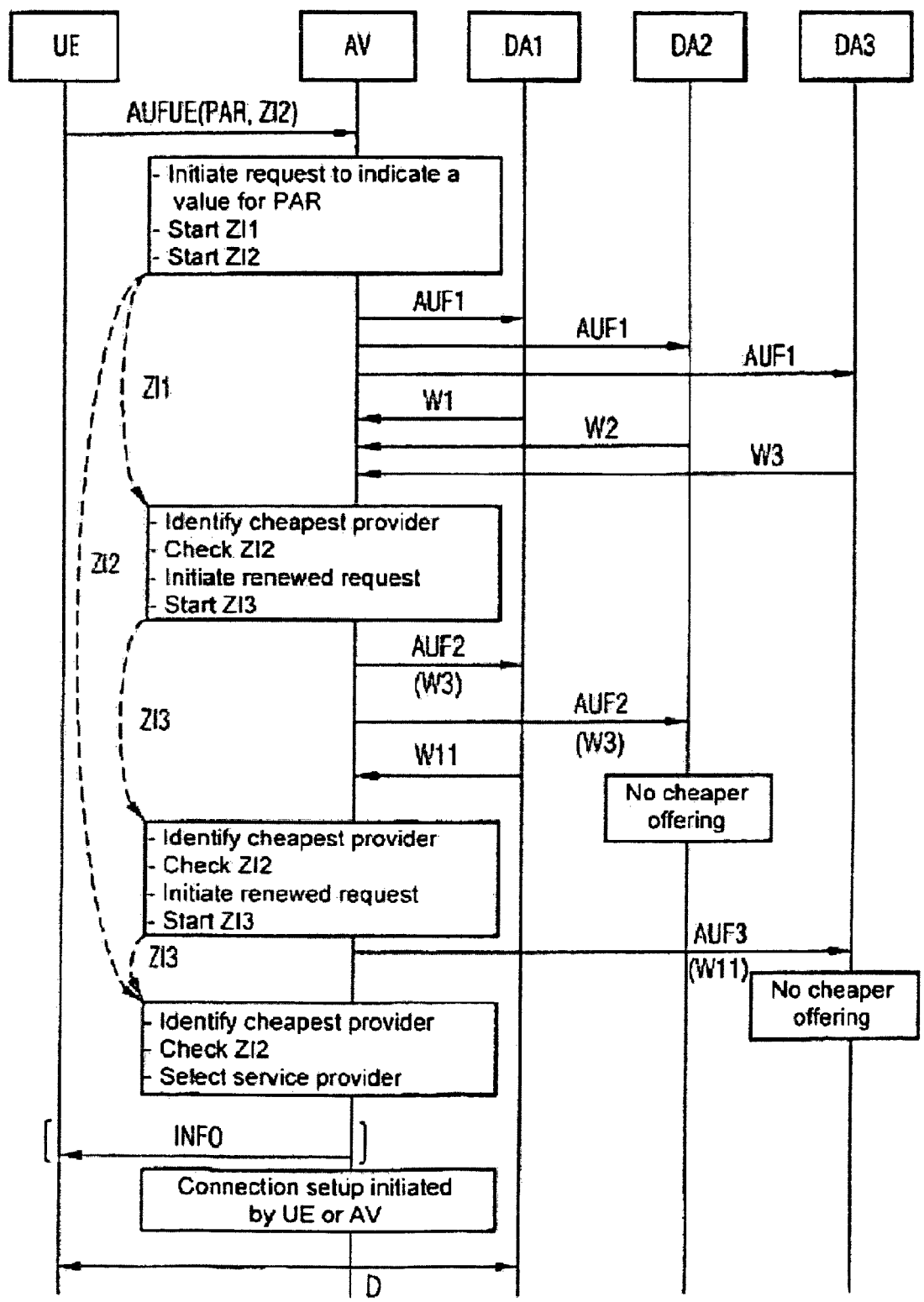
FIG. 2 shows an inventive selection of a most favorable service provider.

A possible flow of a method for selecting a service provider DA1, DA2, DA3 is shown schematically in FIG. 2. The temporal flow of selecting a service provider DA1, DA2, DA3 is to be read in FIG. 2 from top to bottom.

The user station UE sends the WLAN's selecting device AV the request AUFUE to select a service provider DA1, DA2, DA3 along with the specification of the second time interval ZI2. The selecting device AV conveys a first request AUF1 to indicate a value of the selection parameter PAR to the three service providers DA1, DA2, DA3. For example the selecting device AV sends a request to indicate a price demanded by the respective service providers DA1, DA2, DA3 for the service. Simultaneously with the first request AUF1 the selecting device AV starts a first counter for determining a first time interval ZI1 that specifies for how long the selecting device AV will wait for values of the selection parameter PAR from the service providers DA1, DA2, DA3. Simultaneously with the first counter a second counter is also started which determines the second time interval ZI2 which, as already mentioned above, indicates the length of time the selecting of a service provider DA1, DA2, DA3 is allowed to take in total.

The service providers DA1, DA2, DA3 transmit their values W1, W2, W3 of the selection parameter PAR to the selecting device AV within the first time interval ZI1. The selecting device AV determines the service provider DA3 having the selection parameter value that is most favorable for the user station UE, which is to say it determines the cheapest service provider, in this case the third service provider DA3, and checks whether the second time interval ZI2 has expired yet. Had the second time interval ZI2 expired, the third service provider DA3 would have been selected as the provider of the service D. However, the second time interval ZI2 has not yet expired, so the selecting device AV initiates a second request AUF2 to the first and second service provider DA1, DA2 to indicate a value of the selection parameter PAR so that said service providers DA1, DA2 are able to undercut the third service provider DA3. Along with the renewed request AUF2, the selecting device AV notifies the two service providers DA1, DA2 of the value W3 of the selection parameter of the third service provider DA3. Notification of the most favorable value W3 of the selection parameter being optional, this has been indicated by putting the reference to the value W3 in parentheses. The first counter is restarted simultaneously with the second request in order to measure a third time interval ZI3 which in this exemplary embodiment is exactly as long as the first time interval ZI1. The second service provider DA2 opts not to undercut the value W3 of the third service provider DA3 and does not send the selecting device AV a new value of the selection parameter. The first service provider DA1 sends the selecting device AV a new value W11 of the selection parameter undercutting the value W3 of the third service provider DA3.

The selecting device AV determines on expiration of the third time interval ZI3 that the first service provider DA1 now has the cheapest offering for the service and checks again whether the second time interval ZI2 has expired. That not being the case, the requesting unit AV sends off a third request AUF3 to indicate a value of the selection parameter and restarts the first counter and hence the third time interval ZI3. The third request AUF3 will only be sent to the third service provider DA3 since the second service provider DA2 was not willing to indicate a more favorable value of the selection parameter in response to the last request AUF2 and that decision is regarded as final. Along with the third request AUF3 the third service provider DA3 also receives the value that is most favorable at that instant, which is to say the value W11 of the selection parameter last indicated by the first service provider DA1. The third service provider DA3 decides not to undercut said value W11 of the selection parameter and so does not send the selecting device AV a new value of the selection parameter.

It is of course also possible for the selecting device AV always to send a renewed request to all service providers DA1, DA2, DA3 who have not indicated the most favorable value of the selection parameter, or for a renewed request always to be sent to all service providers DA1, DA2, DA3 irrespective of a last indicated value of the selection parameter.

After a second expiration of the third time interval ZI3 the selecting device AV determines the first service provider DA1 to be the most favorable service provider and selects the first service provider DA1 as the service provider for the service D because the second time interval ZI2 has meanwhile also expired. The selecting device AV will then either assign the user station UE the first service provider DA1, which is to say will automatically initiate a connection setup between the user station UE and the first radio communication system N1, or the selecting device AV will notify the user station UE by means of information INFO that the first service provider DA1 has been selected for the service D. Putting the information INFO in parentheses indicates that transmission of the information INFO to the user station UE is optional. The user station UE itself decides on the basis of the information INFO that the service will be received via the first service provider DA1 and initiates a connection setup. The user station UE can of course also reject a connection setup and, for example, send the selecting device AV a renewed request to select a service provider DA1, DA2, DA3. The user station UE can in this way attempt to obtain an even better offering.

If two or more service providers have indicated the same value after the second time interval has expired, then the selecting device will select one of the most favorable service providers by drawing lots, which is to say randomly.

If, in an exemplary embodiment not shown, at least two service providers have indicated the same most favorable value of the selection parameter before the second time interval has expired, then those service providers will be informed by means of a corresponding message, along with a renewed request to indicate a value of the selection parameter, that a multiplicity of service providers have indicated the same value of the selection parameter. The service providers concerned will thus be able to better assess their offering and will be given an opportunity to improve their own offering, which is to say to undercut their competitors, and pre-empt a drawing of lots.

If the selecting device AV receives no values from the service providers DA1, DA2, DA3 within the first or third time interval ZI1, ZI3, it will continue repeating its request until it does receive values or until the second time interval ZI2 has expired. If no values have been received even after the second time interval ZI2 has expired, the selecting device AV will notify the user station UE of this. The user station can thereupon initiate renewed selection of a service provider.

The duration of the first and third time interval ZI1, ZI3 is specified by, for example, the WLAN operator. This duration can be adapted to the transmission times to the service providers and specified individually for each service. The first and third time interval ZI1, ZI3 can of course be either equally long or of different length. In particular, the third time interval ZI3 can be shorter than the first time interval ZI1 so that a renewed request can be sent to the service providers even if the second time interval ZI2 expires while a renewed request is being sent having the duration of the first time interval ZI1.

If the duration, predefined by the user station UE, of the second time interval ZI2 is shorter than the duration of the first time interval ZI1, then the selecting device AV will specify the duration of the second time interval as being longer than or equal to the duration of the first time interval ZI1. The third time interval ZI3 can of course also be predefined by the user station UE.

The second time interval ZI2 can of course also be specified by the WLAN operator.

Service providers can also offer the user station UE the service D without having their own radio communication system. On the basis of a suitable agreement with the operator of the WLAN, even service providers not having their own infrastructure are able to offer the service D. The service will in that case, for a usage fee, be transmitted directly by the WLAN. The operator of the WLAN can of course also be a service provider.

The invention claimed is:

1. A computerized method for selecting a provider that provides a radio communication service that can be received by a mobile station via a radio access network and is provided by a plurality of service providers via the radio access network, the method comprising:
   receiving from the mobile station via a radio interface of the radio access network a request to select a provider for the service from the plurality of service providers by a selecting device;
   requesting the plurality of service providers to indicate a value of a selection parameter by the selecting device;
   selecting the provider by the selecting device based on the values received from the indication request, the plurality of service providers indicating respective values within a first time interval and the selecting of the provider occurring after a second time interval, wherein after the first time interval comparing the values received with each other to perform an initial selecting of a provider based on a most favorable value from the values received, and re-requesting at least a portion of the plurality of service providers to indicate a new value of the selection parameter, wherein in the event the received new values of at least two providers have an identical value, the selecting by the selecting device is performed on a random basis; and
   notifying said portion of the service providers of the most favorable value from the values received so that at least one of said service providers can provide a new value chosen to undercut the most favorable value;
   wherein, in the event the received new values of at least two service providers have identical values, said at least two service providers is each notified of the existence of said identical values so that at least one of said at least two service providers can change its own identical value to pre-empt a random selection.

2. The method according to claim 1, wherein the mobile station is informed about the selected provider.

3. The method according to claim 1, wherein the selecting device assigns the mobile station to the selected provider for a connection setup via the radio interface.

4. The method according to claim 1, wherein the portion of the plurality of service providers are re-requested to indicate the value of a selection parameter within a third time interval.

5. The method according to claim 4, wherein the portion of the plurality of service providers are notified of the most favorable value.

6. The method according to claim 5, wherein the portion of the plurality of service providers are informed if the most favorable value has been indicated by at least two of the plurality of service providers.

7. The method according to claim 4, wherein the value from the request is different than the value from the re-request.

8. The method according to claim 1, wherein the selection parameter is defined by the mobile station.

9. The method according to claim 1, wherein the selection parameter includes a price of the service.

10. The method according to claim 1, wherein the selection parameter includes a quality of service.

11. A computerized selecting device for selecting a provider for a radio communication service that can be received by a mobile station via a radio access network and is provided by a plurality of service providers via the radio access network, the selecting device comprising:
    a receiver capable of receiving a request sent by the mobile station via a radio interface of the radio access network to select a provider for the service;
    a transmitter capable of sending a request to indicate a value of a selection parameter to the plurality of service providers, the receiver capable of receiving response having an indicated value from each of the plurality of service providers;
    a selector capable of selecting a provider from the plurality of service providers based on the indicated value from each response; and
    a first timer that after expiring, the values received are compared with each other, and a most favorable value is determined by the selector from the values received, wherein the selector is configured to perform an initial selection of a provider based on the most favorable value determined from the values received, and further configured to re-request at least a portion of the plurality of service providers to indicate a new value of the selection parameter, wherein in the event the received new values of at least two providers have identical values, the selector is configured to select a provider on a random basis, wherein said portion of the service providers is notified of the most favorable value from the values received so that at least one of said service providers can provide a new value chosen to undercut the most favorable value, and further wherein, in the event the received new values of at least two service providers have identical values, said at least two service providers is each notified of the existence of said identical values so that at least one of said at least two service providers can change its own identical value to pre-empt a random selection.

12. The method according to claim 11, wherein the value from the request is different than the value from the re-request.

13. The method according to claim 11, wherein the selection parameter includes a price of the service, a quality of service or both.

14. The method according to claim 13, wherein the selection parameter is defined by the mobile station.

* * * * *